Aug. 19, 1941.  A. VISCHER, JR  2,252,874
PRESSURE INDICATOR
Filed Nov. 4, 1938
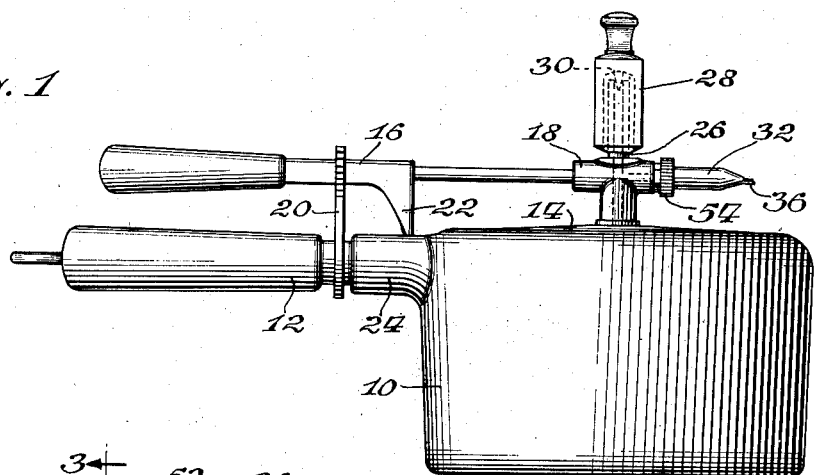
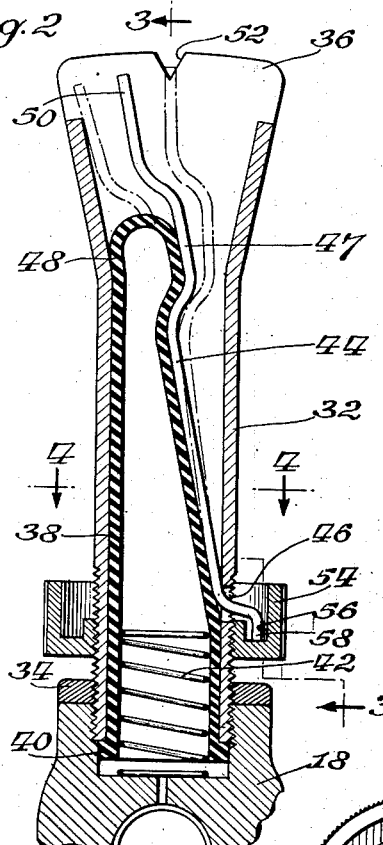
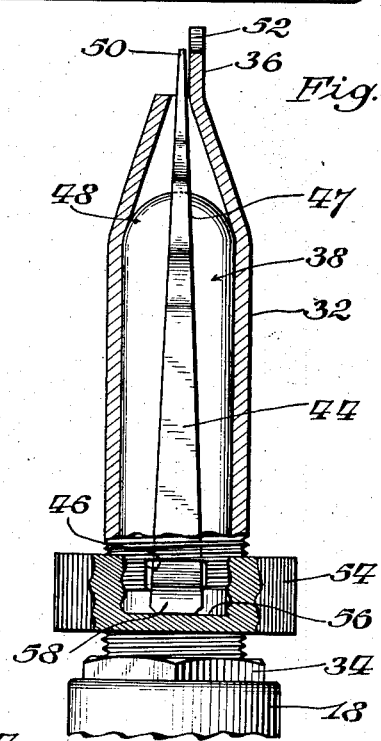
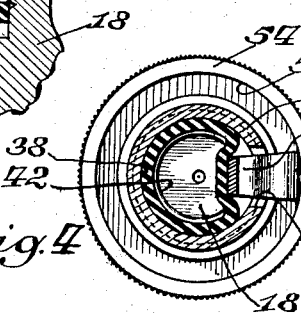
Inventor
Alfred Vischer Jr.
By Williams, Bradbury
McCaleb & Hinkle
Attys.

Patented Aug. 19, 1941

2,252,874

UNITED STATES PATENT OFFICE 2,252,874

PRESSURE INDICATOR

Alfred Vischer, Jr., Park Ridge, Ill., assignor to Vischer Products Company, Chicago, Ill., a corporation of Illinois Application November 4, 1938, Serial No. 238,758

6 Claims. (Cl. 73—110)

My invention relates generally to indicators of fluid pressure, and more particularly to an indicator of this type usable on pressure cookers and similar apparatus.

It is desirable, in the operation of a pressure cooker, to have some means for indicating when the pressure within the cooker has attained the desired cooking pressure. It is customary to use ordinary Bourdon pressure gauges for this purpose. Such gauges, however, are of relatively high initial cost, and due to the delicacy of the parts, become inaccurate after being used for some time. Furthermore, they are customarily provided with a glass face which is subject to breakage on a utensil, particularly such a utensil as a pressure cooker. Likewise, since the gauge is subjected to frequent changes in temperature, it is desirable, in order to make it accurate, that some means be provided for compensating for temperature changes. Furthermore, since the gauge is used in a hot, humid atmosphere, the parts thereof are liable to corrode. To provide a Bourdon type gauge which would be made of non-corrosive metal, unbreakable glass, and which would be accurate under all conditions of use, would be possible, but the gauge would be extremely high in cost so as to make its use upon a relatively inexpensive pressure cooker, impractical.

It is thus an object of my invention to provide a pressure indicator, particularly designed for use on pressure cookers, which is made up of a few simple parts which cannot readily get out of order, and which can be manufactured at a very low cost.

Other objects will appear from the following description, reference being had to the accompanying drawing, in which Fig. 1 is an elevation showing a pressure cooker with the improved indicator attached thereto;

Fig. 2 is a longitudinal, sectional view of the indicator;

Fig. 3 is a sectional view taken on the line 3—3 of Fig. 2; and

Fig. 4 is a transverse, sectional view taken on the line 4—4 of Fig. 2.

The pressure cooker for which the indicator is particularly adapted, as shown in Fig. 1, comprises a saucepan 10 provided with a handle 12. A flexible cover 14 is adapted to seal the opening in the top of the pan and is provided with a handle 16 which is secured in a fitting 18 which is suitably secured to the cover 14. A locking hook 20 is pivotally mounted upon the handle 16 and is adapted to hook beneath a portion of the handle 12, thereby to hold the cover in place, the handle 16 having a downwardly extending projection 22 fulcrumed on a boss 24 formed on the pan 10. The fitting 18 is tapped to receive the central tube 26 of a pressure relief device, which comprises merely a weight 28 having a valve 30 resting upon and closing the upper end of the tube 26.

The pressure indicator comprises a generally tubular housing 32, one end of which is threaded in the fitting 18, and is locked in position by a half nut 34. The outer end of the housing 32 is flattened to fishtail shape, as shown in Fig. 2, and is provided with a flat notched extension 36. Within the tubular housing 32 is a sack 38 made of a suitable rubber substitute, such as "Neoprene" or similar composition, which is flexible and elastic, and whose properties do not change appreciably when subjected to the pressures and temperatures created in the operation of pressure cookers.

The open end of the sack 38 is provided with a shoulder 40 which abuts against the end of the tubular housing 32. This end of the sack 38 is held against the inner wall of the tubular housing 32 by a helical spring 42 which, due to its radial expansion, holds the flange 40 against the end of the housing 32 and holds the adjacent portion of the sack in sealing contact with the inner wall of the housing. An indicator or pointer 44 is conformed to project through an opening 46 formed in the housing 32 and engages the housing 32 at the upper edge of this opening. The pointer 44 tapers gradually in width, as shown in Fig. 3, and normally presses against the sack 38 to collapse the latter. The pointer has a sidewardly bent portion 47 to provide for the bulbous and bulging portion 48 of the sack 38. The outer extremity 50 of the pointer 44 is adapted to travel above the surface of the extension 36 and in cooperation with the notch 52 formed in said projection, to indicate the proper pressure at which the cooker is to be operated.

In Fig. 2, the pointer 44 is shown in an intermediate position as when a pressure of about seven pounds is present within the sack 38. When the pressure in the cooker is released, the pointer will swing to the left from the position in which it is shown in full lines, to the position in which it is shown in dotted lines.

The indicator may be calibrated by adjustment of a knurled nut 54 which is threaded on the housing 32 adjacent the opening 46 and which is provided with an annular groove 56 to receive the inner extremity 58 of the pointer 44. By turning the nut 54 outwardly, the device may be adjusted to require a higher pressure to bring the end 50 of the pointer in alignment with the notch 52. The pointer itself serves as a locking device to prevent inadvertent turning of the nut 54, since the end 58 thereof presses against the nut at all times with sufficient force frictionally to hold the nut in place.

The indicator is made so simply that it may readily be taken apart for cleaning, if this becomes necessary, and its calibration is accomplished so readily that the ordinary housewife can readily recalibrate the indicator should it accidentally become out of adjustment. This latter operation may be performed merely by bringing the pressure within the cooker up to fifteen pounds (assuming this is the pressure at which the weighted valve 30 is unseated). When this pressure is attained, there will be some escape of steam past the valve 30 and under these conditions the nut 54 can be easily turned inwardly or outwardly to bring the end 50 of the pointer 44 into alignment with the notch 52.

In the use of a pressure cooker, it is of substantially no importance for the user to know the particular pressure within the cooker, except that the user should know that the standard cooking pressure of, let us say, fifteen pounds per square inch is being maintained. The above described indicator accomplishes this purpose, since it shows the user when the standard cooking pressure is attained, and gives an approximate indication of the intermediate pressures. This approximate indication is sufficiently accurate for all the practical purposes, since the user has no interest in the exact value of the intermediate pressures.

Due to the arrangement of the pointer 44 within the casing, the sack 38 cannot flex the pointer beyond its elastic limit, while at the same time the pointer has sufficient inherent resiliency and elasticity to cause the collapse of the sack when the pressure therein drops to atmospheric pressure. Since the pointer movement is resultant from flexure of the pointer, it is not influenced by the friction of any bearing, as is the case with most of the conventional pressure indicators.

While I have shown and described a particular form of my invention, it will be apparent to those skilled in the art that various changes and modifications may be made without departing from the basic principles of the invention. I therefore desire, in the following claims, to include within the scope of my invention all such equivalent constructions whereby substantially the results of my invention may be obtained by substantially the same means.

I claim:

1. In a pressure indicator, tubular sac of flexible rubber-like material, having an outwardly projecting shoulder at the open end of said sac, a rigid generally tubular casing surrounding said sac and having its end abutting against said shoulder, resilient means within said sac adjacent the lower end thereof for pressing said end portion radially outwardly against the inner surface of said casing, a resilient member pressing against said sac adjacent the closed end thereof to deform the latter, and an indicator showing the position of said resilient member with respect to said casing.

2. In a pressure indicator, a generally tubular flexible rubber-like open-end sac, a fixed and rigid generally tubular casing fitting relatively closely about said sac, said sac being supported by said casing throughout more than half of the external area of the sac, and a leaf spring indicator element having one end secured with respect to said casing, said element extending along and resiliently pressing radially against said sac and adapted to be moved by the latter upon a change in differential pressure upon the walls of said sac.

3. In a pressure indicator, the combination of a tubular flexible rubber-like sac, a generally tubular casing surrounding said sac in close proximity to the outer surface thereof, said casing having a flattened flaring end portion providing an indicating surface, and a resilient pointer having one end secured to said casing and having its other end extending freely through the flattened end portion of said casing and cooperating with said indicating surface, said pointer having a part intermediate its ends pressing against the side of said sac to be moved by the latter an extent determined by the differential pressure on the opposite sides thereof.

4. In a pressure indicator, the combination of a housing, an open-end flexible sac having its open end arranged to be subjected to fluid pressure, a pointer resiliently pressed against said sac and arranged to be moved as the shape of the latter is altered by the application of fluid pressure thereto, said pointer having a portion projecting through an opening in said housing, and means engageable with said portion of the pointer for adjusting the magnitude of the force with which the pointer presses against said sac.

5. In a fluid pressure indicator for pressure cookers and the like, the combination of a casing, a flexible tubular sac within said casing and having one surface thereof exposed to a fluid the pressure of which is to be indicated and having its opposite surface exposed to atmospheric pressure, resilient means engaging said sac to press against the latter to resist the pressure of the fluid, a pointer actuated by said means to indicate the extent of movement of a portion of said sac under the influence of fluid pressure, and a spring within said sac adjacent the open end thereof to press the open-end portion thereof radially outwardly in sealing contact with said casing.

6. In a pressure indicator, the combination of a housing, an open-end flexible sac having its open end arranged to be subjected to fluid pressure, the greater portion of the external surface of said sac being close to and supported by said housing, a pointer engaging said sac and arranged to be moved as the shape of the latter is altered by the application of fluid pressure thereto, said pointer having one end portion thereof projecting through an opening in said housing and cooperating with said housing to provide a pressure indication, and means for fixedly securing the other end portion of said pointer to said housing in a manner to cause an intermediate portion of said pointer resiliently to press against said sac.

ALFRED VISCHER, Jr.